UNITED STATES PATENT OFFICE.

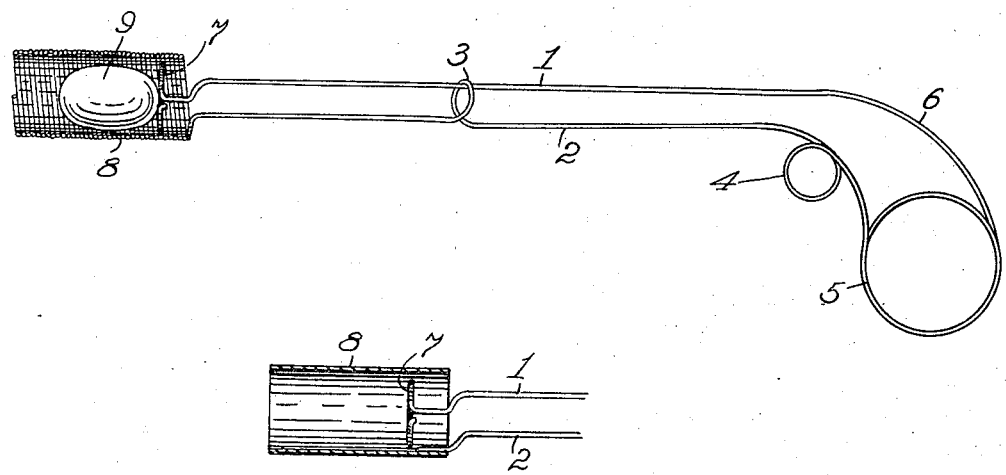

GUS H. FRENCH, OF WATERLOO, IOWA.

DOSING DEVICE FOR ANIMALS.

1,241,952.     Specification of Letters Patent.     Patented Oct. 2, 1917.

Application filed April 24, 1917. Serial No. 164,154.

*To all whom it may concern:*

Be it known that I, GUS H. FRENCH, a citizen of the United States of America, and a resident of Waterloo, Blackhawk county, Iowa, have invented certain new and useful Improvements in Dosing Devices for Animals, of which the following is a specification.

My invention relates to improvements in dosing devices for animals, and the object of my improvement is to provide a device for introducing a capsule into an animal's throat and ejecting same therein, surely, conveniently, and without danger to the operator.

This object I have accomplished by the means which are hereinafter described and claimed, and which are illustrated in the accompanying drawings, in which Figure 1 is an elevation, in partial longitudinal section, of my improved dosing device, and Fig. 2 is a modified form of same, with parts broken away.

Similar numerals of reference denote corresponding parts throughout the several views.

It is inconvenient, as well as sometimes dangerous, to administer a dose of medicine to a horse or other animal, and the attempt often fails for want of a suitable appliance for the purpose.

My device consists of an elastic wire rod doubled medially into members 1 and 2 which are bent downwardly and formed into a circular loop 5, the latter serving to stiffen the loop without detracting from the resilient connection of said members. This downwardly directed part 6 of the device serves as a handle, while the lower member 2 has a circular loop 4 formed in it at its angle, serving as a finger-hold. The members 1 and 2 are parallel, and preferably another loop 3 is formed in the lower member 2 passed about the member 1 to act as a guide therefor. The extremity of the member 1 is formed into a ring or head 7, and the terminal part of the member 2 may be formed into a helical coil 8 comprising a barrel encompassing said head 7.

To use the device, a capsule 9 containing medicine or other substance is placed in the barrel 8 in contact with the head 7. The grip-handle 6 is grasped in the hand, and when the barrel has been inserted in the animal's mouth, the resilient grip 6 is squeezed together by a contraction of the fingers. The pull upon the finger-hold loop 4 draws back the barrel 8 suddenly over the head 7 dropping the capsule to be swallowed by the animal, without failure or danger to the operator and without throwing it forcibly into the animal's gullet, which might choke the animal.

In Fig. 2 is shown a modified device, wherein the barrel 8 is formed from an open-ended cylinder brazed or otherwise attached to said member 2. Said barrel may be made of metal, rubber, or other desired material, and the members 1 and 2 may be otherwise formed and movably or resiliently connected to permit like relative movements of the barrel 8, without departing from the scope of my invention.

Having described my invention, what I claim as new, and desire to secure by Letters Patent, is:

1. A dosing device for animals, comprising a resilient rod bent medially downwardly to provide a yielding handle, with members positioned adjacent each other, a hollow barrel on the extremity of one member, and a body on the extremity of the other member positioned within said barrel.

2. A dosing device for animals, comprising a resilient rod bent into a downwardly directed handle, with members arranged in parallel relation, one member having a loop inclosing the other member, a barrel on the extremity of one member, and a body on the extremity of the other member within said barrel.

3. A dosing device for animals, comprising an elastic rod bent to form parallel members with a depending handle loop whose parts may be yieldingly resiliently moved toward each other to shift one member longitudinally relatively to the other member, holding-means on one member, and a body on the other member within said holding-means.

4. A dosing device for animals, comprising an elastic rod medially bent into a downwardly directed loop, with parallel members, the extremity of one member being coiled helically to form an open-ended barrel, and the extremity of the other member formed into a body positioned within said barrel.

5. A dosing device for animals, comprising a resilient rod bent into loop form with finger engaging means on one member of the loop, the member having said finger engaging means also having a terminal hollow receptacle thereon, and the other member of the loop having a terminal enlargement positioned within said receptacle.

Signed at Aberdeen, S. Dakota, this 21st day of April, 1917.

GUS H. FRENCH.

Witnesses:
LUCILE MARICLE,
F. G. TUTTLE.

Copies of this patent may be obtained for five cents each, by addressing the "Commissioner of Patents, Washington, D. C."